United States Patent [19]

Hipple et al.

[11] Patent Number: 4,633,711

[45] Date of Patent: Jan. 6, 1987

[54] LOCAL DISPLAY TECHNIQUE FOR FIBER OPTIC ILLUMINATOR/HOOD SYSTEM

[75] Inventors: James H. Hipple; Don W. Smith; Neil E. Reed, all of Lancaster, Ohio

[73] Assignee: The Babcock & Wilcox Company, New Orleans, La.

[21] Appl. No.: 646,715

[22] Filed: Sep. 4, 1984

[51] Int. Cl.[4] .............................................. G01F 23/00
[52] U.S. Cl. ...................................... 73/293; 73/290 R
[58] Field of Search ................... 73/293; 116/DIG. 5, 116/DIG. 26, 202; 250/577; 350/319; 137/558, 559; 116/227, 201

[56] References Cited

U.S. PATENT DOCUMENTS

| | | | |
|---|---|---|---|
| 3,678,741 | 7/1972 | Burley | 116/DIG. 5 |
| 4,387,594 | 6/1983 | Berthold | 73/293 |
| 4,397,182 | 8/1983 | Bakul | 73/293 |

Primary Examiner—Charles Frankfort
Assistant Examiner—W. Morris Worth
Attorney, Agent, or Firm—Vytas R. Matas; Robert J. Edwards

[57] ABSTRACT

A local display of a fluid level is provided in connection with a fiber optic illuminating system in which a side by side, bi-color light is passed through the fluid in a level gauge having transparent viewing ports. Diverging light passing from the level gauge, refracted in response to the fluid and gauge material, is masked and one color is passed to a focusing lens and a local readout in a plane above or below the focusing lens.

8 Claims, 4 Drawing Figures

LOCAL DISPLAY TECHNIQUE FOR FIBER OPTIC ILLUMINATOR/HOOD SYSTEM

TECHNICAL FIELD

The present invention relates to fluid level indicators utilizing fiber optic light conducting elements and, more particularly, to an improved method and apparatus for generating a local readout display of a boiler steam/water level.

BACKGROUND ART

It is often desirable to provide fluid level instrument readout capability both locally, in proximity to the instrumented equipment, and at a remote location. In electric generating power plants and industrial applications, for example, boiler steam/water level readout is typically provided in the vicinity of the boiler drum and at a panel in a remotely located control room.

U.S. Pat. No. 4,397,182 discloses a fiber optic light conducting system that provides a steam/water level indication for boilers which have both a remote and local readout display of boiler steam/water level.

In that type of system, a plurality of tungsten filament lamps are used to generate light beams which are passed through side-by-side red and green filters. The colored light is focused onto and passed through transparent viewing ports of a boiler water level gauge and then through shutters and secondary focusing lenses which direct the beams through beam splitters. The beam splitters divide each of the beams into a major portion which is focused onto the polished input end of a fiber optic cable that transmits the major portion to the remote control room and a minor portion which is reflected to a locally mounted glass diffuser to provide a local indication of steam/water level. Although such a system may operate satisfactorily, the local readout necessitates an undesirable diversion of power from the fiber optic cable to the control room and is physically expensive to incorporate.

SUMMARY OF THE INVENTION

In accordance with the invention, excess energy (red or green light) that is outside of the secondary focusing lens of a fiber optic illuminating boiler level gauge illuminating system is utilized to provide a continuous local readout display without diverting or otherwise sacrificing any of the optical energy going to the control room.

Thus, a method is provided for optically indicating a fluid level at locations proximate and remote of a level gauge composed of a transparent material and containing a fluid. The method, which is particularly suited for use in indicating the fluid level in a boiler level gauge containing water and steam, includes the steps of passing a converging bi-color light into the the gauge and the fluid where the light refracts responsive to the type of fluid and the gauge material and diverges through the gauge material to the secondary focusing lens. The refraction of the side-by-side bi-color (red and green) light by the fluid media causes one or the other color to pass through an aperture and onto the secondary focusing lens. According to the method, a shutter or masking plate having an adjustable aperture is provided between the gauge and the secondary focusing lens. The aperture and the secondary focusing lens are aligned in the path of the diverging light advancing from the gauge in order to pass one color of the diverging light, through the aperture, to the secondary focusing lens and, as well, around the secondary focusing lens. The other color is masked by the masking plate. The alternate colors are selectively masked or passed by the masking plate as a function of the refractive index of the type of gauge material and the type of fluid through which the bi-color light is passed. In accordance with the method, the central portion of the one color of the diverging light, which is passed through the secondary focusing lens, is focused directly onto a locally receiving face of a fiber optic cable operatively connected to a remote readout assembly. Part of the remaining portion of the diverging light, preferably the portion of diverging light which passes above or below the secondary focusing lens, illuminates a glass diffuser proximate to the gauge operatively creating a continuous local readout display.

BRIEF DESCRIPTION OF THE DRAWINGS

In the accompanying drawings, forming a part of the specification, and in which reference numerals shown in the drawings designate like or corresponding parts throughout the same.

DETAILED DESCRIPTION

Figure 1:
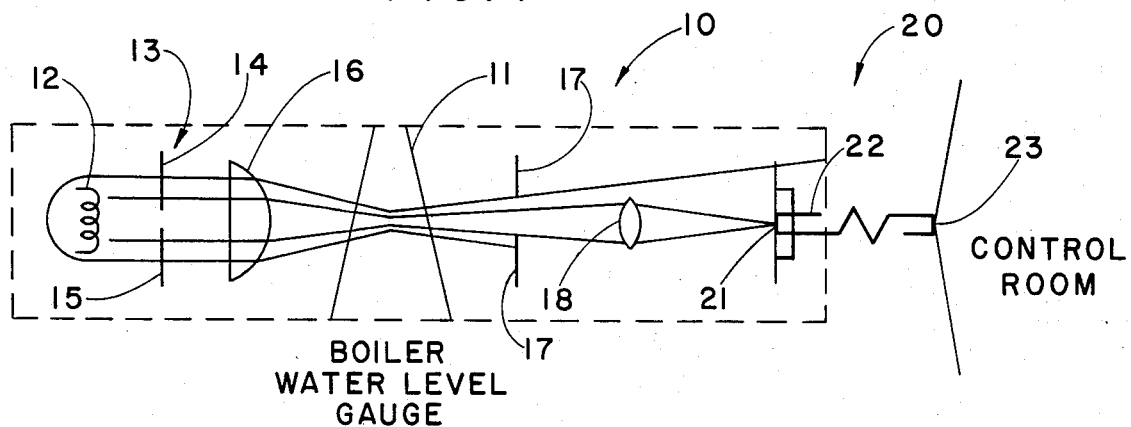
FIG. 1 is a schematic planar representation of a water level indicator arrangement of the present invention.
Figure 2:
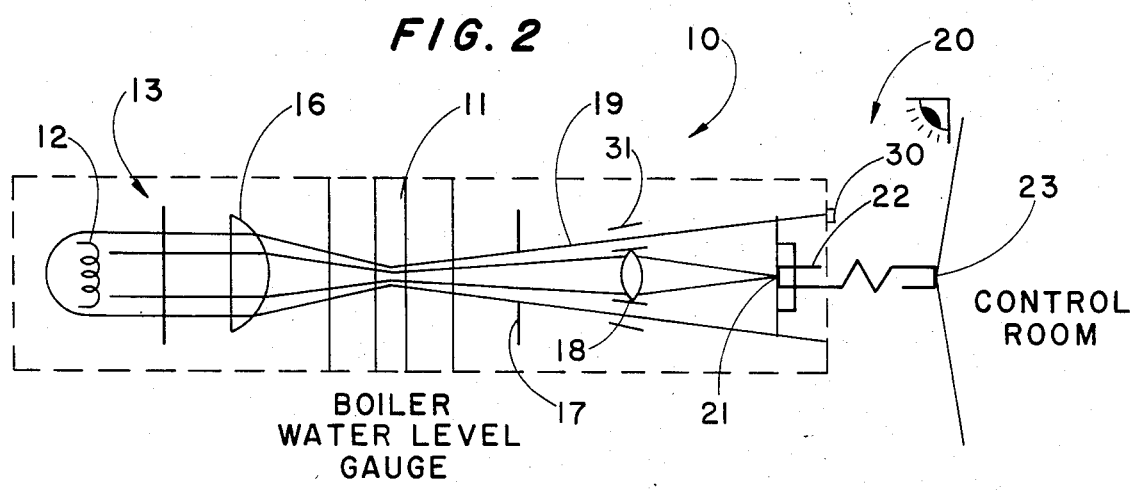
FIG. 2 is a schematic elevational representation of a water level indicator arrangement of the present invention.

FIGS. 1 and 2 illustrate a fiber optic illuminator including an indicator assembly 10 and a fiber optic light conducting system 20 for monitoring the steam/water level of a boiler drum. It should be understood that, while the following description is directed to boiler water level monitoring, such is merely illustrative of a preferred application of the invention and that the described technique, assembly and system may be employed in various fluid level monitoring applications.

The indicator assembly 10 and fiber optic light conducting system 20 are described herein in terms of a single port of what is usually a five-port or more type water level assembly having vertically aligned ports which typically correspond to particular fluid levels of the instrumented equipment. The components of the indicator assembly and fiber optic light conducting system are duplicated for each port of the water level gauge.

As shown, the indicator assembly includes a tungsten-halogen lamp 12, a bi-color filter assembly 13 embodying a red filter 14 and a green filter 15, a primary focusing lens 16 located between the filter assembly 13 and a port 11 of the water level gauge, a shutter or masking plate 17 and a secondary focusing lens 18.

The secondary focusing lens 18 demagnifies and focuses the respective color image onto the input end 21 of a fiber optic cable 22 which, in turn, transmits the image to a viewer 23 mounted on a console in a remote control room.

In the form of the arrangement shown in FIGS. 1 and 2, the red and green filters 14, 15 are positioned, side-by-side, to pass the two colors red and green of a light beam, generated by the lamp 12, through the water level gauge viewing port 11. The colors green and red are accepted in the power industry as standard colors for indicating water and steam, respectively.

The level gauge contains water and steam at high temperature and pressure. The level gauge viewing port 11 is composed of a transparent material which comprises a high strength glass and protective mica barrier as the fluid boundary. In the water level gauge, depending upon the vertical level of the water-steam interface, the bi-color light passes from the transparent material through either water or steam. Since the refraction indices are different, the respective refractions laterally shift the transmission path of the horizontally adjacent, side-by-side, colors left or right. The bi-color light leaving the gauge viewing port 11 is diverging because of the primary lens focal characteristics and diffusion properties of the port materials. An aperture in the masking plate is aligned so that one color of the bi-color light will pass through the aperture in the masking plate 17. Thus, if there is water in the viewing port the bi-color light is shifted by the refraction properties of the water and gauge material so that the color green is passed through the aperture 17 and the color red is blocked or masked by the plate. If steam is in the viewing port, the color red is passed through the aperture and the color green is shifted off the secondary lens 18. The central portion of the diverging colored light which passes through the aperture is directed to the secondary lens 18 which focuses the light onto the input end of the fiber optic cable 21. Since the colored light is diverging, some of the light rays 19 do not pass through the secondary focusing lens 18 but passes outside of the periphery of the lens 18. In accordance with the invention, a direct local display is obtained by providing a second viewing port, for example, in the form of a glass diffuser 30, to intercept at least a part of the remaining portion of the one color of the diverging light advancing from the gauge viewing port and aperture. The glass diffuser is preferably located to intercept light advancing past the secondary lens 18, above or below the lens 18 to intercept diffused light rays 19 which pass through an optical path outside of the secondary lens 18. In a preferred form of the inventive technique, a common vertical plane passes through the vertical centerline of each of the aperture 17, the focusing lens 18 and the glass diffuser 30.

Figure 3:
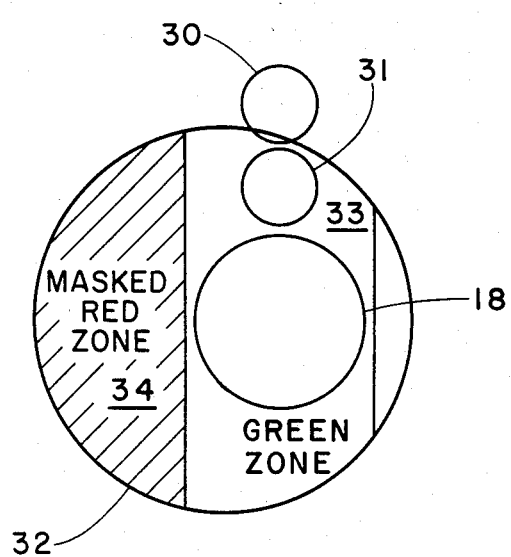
FIGS. 3 and 4 are diagrammatic representations of a vertical projection of a color image onto a secondary focusing lens and diffuser arranged according to the present invention.
Figure 4:
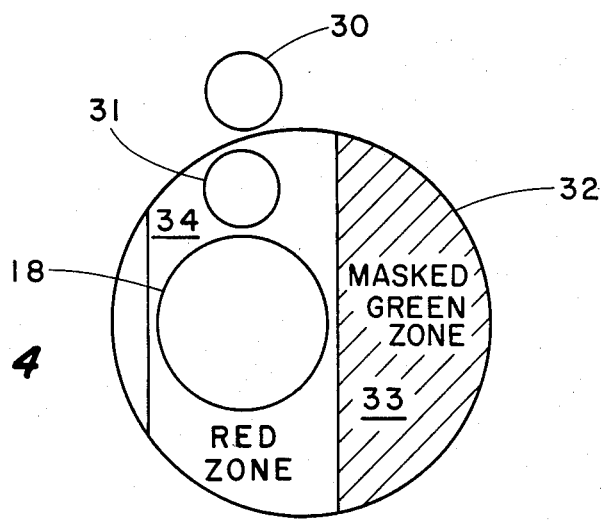

FIGS. 3 and 4 schematically illustrate the vertical superpositioning of the secondary focusing lens 18, the optical window or path 31, the local readout diffuser 30 as well as the superposition of a projection of the bi-color image 32 upon the lens 18 and path 31. FIG. 3 illustrates the superposition of the green zone 33 onto the lens 18 and path 31 to the diffuser 30 to indicate a water condition in the level gauge port 11. FIG. 4 illustrates the superposition of the red zone 34 of the bi-color image onto the lens 18 and path 31 to the diffuser 30 to indicate that steam is in the level gauge port 11.

Thus, in accordance with the invention, a method is provided for optically indicating a fluid level at locations proximate and remote of a viewing port 11 of a level gauge composed of a transparent material fluid boundary containing a fluid. The method includes the steps of passing a bi-color light through the port of the gauge whereby the bi-color refracts responsive to the type of the fluid and the gauge material and thereafter diverges out from the gauge material, providing a masking plate 17 having an aperture between the gauge and the focusing lens 18, and aligning the aperture and the focusing lens 18 in the path of the diverging light so as to pass one color of the diverging light through the aperture to and above and below the focusing lens 18. The method, moreover, further includes the steps of focusing the one color of the diverging light passed to the focusing lens 18 into a locally receiving face 21 of a fiber optic cable 22 of a remote readout assembly and illuminating a glass diffuser 30, proximate the gauge viewing port 11 with the one color of the diverging light which passes above or below the focusing lens 18.

The inventive technique provides a continuous local display which has several important advantages over prior art systems.

The local display achieved by the inventive technique does not require the diversion or dissipation of any of the light which provides the remote or control room image. There are no adjustments which have to be made. The local display, moreover, is direct and passive and does not rely upon any intermediate components to create the image. Accordingly, the local display remains operational in emergency situations even though the fiber optic cable may be severed, for example, by fire.

The embodiments of the invention in which an exclusive property or privilege is claimed are defined as follows:

1. The method of optically indicating a fluid level at locations proximate and remote of a level gauge having a plurality of substantially vertically aligned viewing ports composed of a transparent material, said gauge containing the fluid, which comprises the steps of:

passing a bi-color light through each viewing port of the gauge and the fluid whereby the bi-color light refracts responsive to the type of the fluid and the gauge viewing port material and diverges through the gauge viewing port;

providing a masking plate for each viewing port having an aperture between the gauge viewing ports and focusing lenses, and aligning each aperture and each focusing lens in the path of the diverging light so as to pass a first color of the diverging light through the apertures to and above and below the focusing lenses when one fluid is present within said port and pass a second color of the diverging light through the apertures when a different fluid is present within said ports;

focusing the one color of the diverging light passed to the focusing lens for each port onto a locally receiving face of a fiber optic cable of a port of a remote readout assembly;

illuminating a glass diffuser proximate to each port of the gauge with the one color of the diverging light which passes above or below the focusing lens; and viewing either the remote readout assembly or the glass diffuser proximate to a port of the gauge and determining the fluid level as lying between the port illuminated by said first color and the port illuminated by said second color.

2. The method as set forth in claim 1 wherein the bi-color light is passed through the gauge with two colors of light being passed side by side.

3. The method as set forth in claim 2 wherein the two colors are red and green.

4. The method as set forth in claim 3 wherein the fluid comprises at least one of water and steam.

5. The method as set forth in claim 4 wherein the fluid is water and the bi-color light passing through the gauge and fluid is laterally refracted so that the one color of light passing through the aperture is green.

6. The method as set forth in claim 4 wherein the different fluid is stream and the bi-color light passing through the gauge and fluid is laterally refracted so that the one color of light passing through the aperture is red.

7. The method as set forth in claim 1 wherein the aligning step comprises aligning said aperture and focusing lens so as to advance a central portion of the one color of the diverging light to the focusing lens and at least a part of the remaining portion of the said one color of the diverging light to the glass diffuser.

8. The method as set forth in claim 1 including the step of aligning the masking plate, the focusing lens optical path and the glass diffuser so that a common vertical plane extends through the vertical centerlines of each of the aperture, the focusing lens optical path and the glass diffuser.

* * * * *